United States Patent [19]
Reeder

[11] Patent Number: 6,141,652
[45] Date of Patent: *Oct. 31, 2000

[54] OPERATING APPARATUS

[75] Inventor: Anthony Andrew Reeder, Ispwich, United Kingdom

[73] Assignee: British Telecommunications public limited company, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/607,887

[22] Filed: Feb. 27, 1996

[30] Foreign Application Priority Data

Oct. 10, 1995 [EP] European Pat. Off. ............. 95307148

[51] Int. Cl.$^7$ ............................... H04L 9/00; G06F 17/60
[52] U.S. Cl. ............................... 705/53; 705/76; 705/400
[58] Field of Search ............... 380/4, 25; 705/51–53, 705/59, 64, 63, 400; 709/224

[56] References Cited

U.S. PATENT DOCUMENTS

| | | |
|---|---|---|
| 4,599,647 | 7/1986 | George et al. . |
| 4,658,093 | 4/1987 | Hellman . |
| 4,694,492 | 9/1987 | Wirstrom et al. ........................ 380/23 |
| 4,977,594 | 12/1990 | Shear . |
| 5,010,571 | 4/1991 | Katznelson ................................. 380/4 |
| 5,103,476 | 4/1992 | Waite et al. . |
| 5,202,923 | 4/1993 | Kuriyama ................................. 380/50 |
| 5,309,434 | 5/1994 | Maekawa ................................. 370/62 |
| 5,325,419 | 6/1994 | Connolly et al. . |
| 5,388,211 | 2/1995 | Hornbuckle ............................ 395/712 |
| 5,495,531 | 2/1996 | Smiedt ..................................... 380/4 |
| 5,548,645 | 8/1996 | Ananda ..................................... 380/4 |
| 5,574,964 | 11/1996 | Hamlin .................................... 455/3.1 |
| 5,608,447 | 3/1997 | Farry et al. ............................. 348/7 |
| 5,625,690 | 4/1997 | Michel et al. ............................ 380/4 |
| 5,721,780 | 2/1998 | Ensor et al. ............................ 380/25 |

FOREIGN PATENT DOCUMENTS

| | | |
|---|---|---|
| 2697358 | 4/1994 | France . |
| WO 84/01073 | 3/1984 | WIPO . |
| WO 93/01550 | 1/1993 | WIPO . |

OTHER PUBLICATIONS

Siuda, "Security Services in Telecommunications Networks", Mapping New Applications onto New Technologies, Zurich, Mar. 8–10, 1988, pp. 45–52, XP 000215989.

*Primary Examiner*—Gilberto Barrón, Jr.
*Attorney, Agent, or Firm*—Nixon & Vanderhye P.C.

[57] ABSTRACT

A method of operating apparatus for value, the apparatus being connected to a telecommunications channel, includes the steps of transmitting a forward message from the apparatus to a remote location via the telecommunications channel; receiving a corresponding return message from the remote location via the telecommunications channel; verifying the return message to determine whether it is authentic; and, if so; permitting the operation of the apparatus; and, if not; inhibiting the operation of the apparatus. A method of charging for the operation of apparatus connected to a telecommunications channel is also disclosed including the steps of; receiving a forward message from the apparatus via the telecommunications channel; verifying the forward message to determine whether it corresponds to a predetermined apparatus; and, if so; transmitting a return message to the apparatus via the telecommunications channel; and generating a charge to an entity associated with the apparatus.

24 Claims, 12 Drawing Sheets

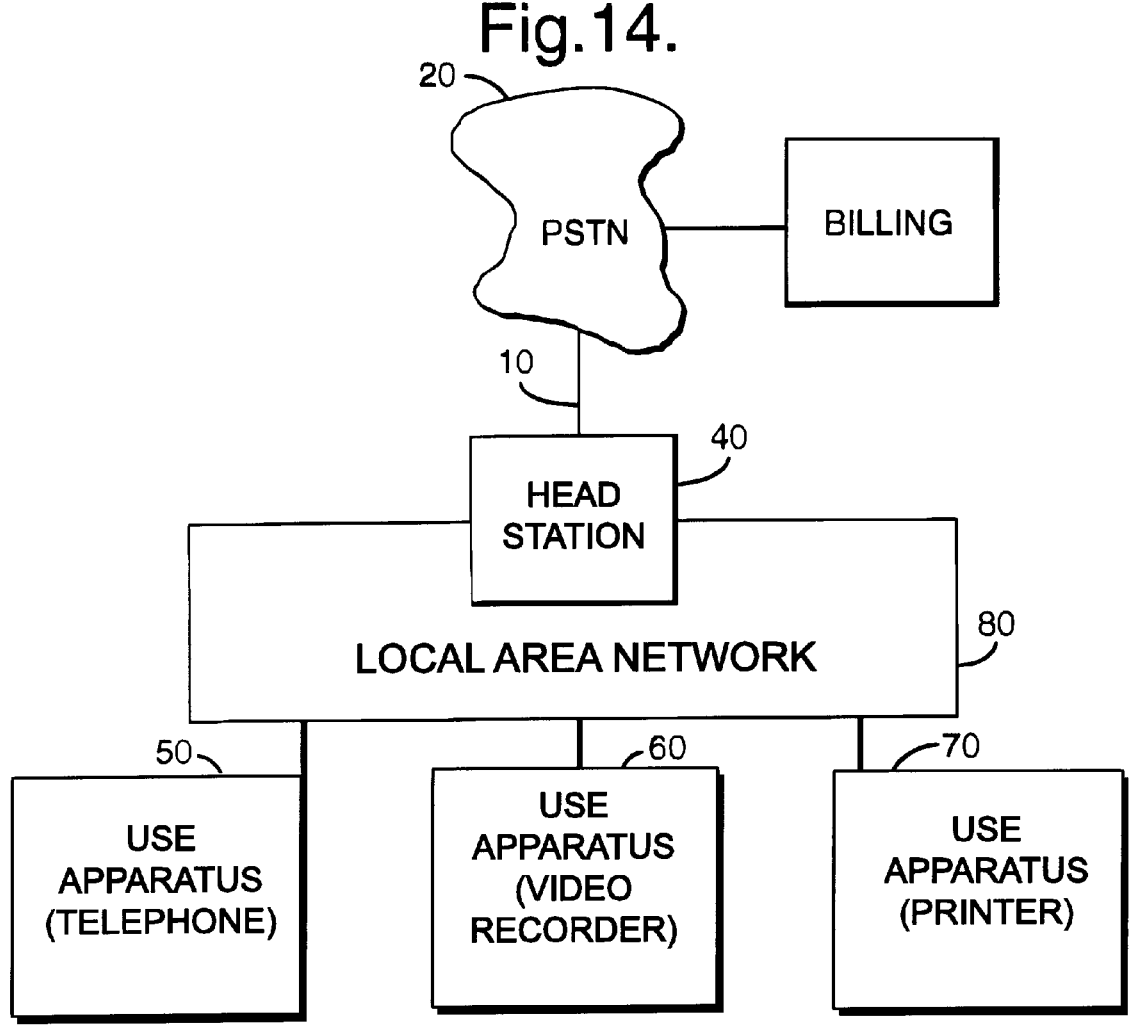

OPERATING APPARATUS

BACKGROUND OF THE INVENTION

1. Field of the Invention

The present invention relates to a method and apparatus for operating apparatus (particularly programmable apparatus such as a computer) for value (for example, for rental).

2. Related Art

The rapid development of the computer industry over the last few decades has led to large investments in the development of new computer programs for operating programmable computing apparatus, and banks of data accessed by such apparatus under the control of such programs.

It is, however, extremely fast and easy for multiple copies of such programs or data to be produced, thus making it difficult for the developers to recoup their development costs. In some cases, illegal conspiracies to defraud the developers are perpetrated. In other cases, lazy or opportunistic users who are not habitual law breakers are tempted by the sheer ease of electronic copying to make multiple copies against the wishes of the developers.

Further difficulties in controlling access to, and ensuring payment for, the use of software and data are emerging with the widespread interconnection of computers via the Internet, which has resulted in data and programs being accidentally or intentionally made available for copying and downloading via a telecommunications network over which the internet is carried.

In the face of these issues, a number of different strategies have evolved for receiving payment for programs and data.

Computer programs are generally sold as copies, for which a single licence fee is paid. In return for the payment of a licence fee, the user is contractually bound (and bound by the laws of copyright of most countries) not to make further copies without payment. However, the threat of legal redress does not deter some users, who are well aware that detection of copying is extremely difficult.

Where programs are downloaded, payment is generally sought before the program is supplied; this may, for example, be by supply of a credit card number via the telecommunications network from the apparatus to which the program is to be supplied. However, once the program has been supplied then the same problems arise as when the program is sold over the counter. Furthermore, the supply of a credit card number carries associated security risks for the user.

WO-A-85/01854 discloses a system for dissemination of educational software in which software is downloaded and usage of the software is recorded locally.

Charges for the supply of data are typically calculated on the basis of the time over which a user apparatus is connected to the database host computer, or on the number of records or amount of data downloaded, or both. However, other than through legal redress, there is no control over subsequent copying or reuse of the data.

Some programs (notably for more expensive workstations) contain encoded data which is checked against encoded data stored on the workstation apparatus, the program being arranged not to operate unless the two match. Thus, illicit copies of a program for one workstation cannot be made to run on another. However, whilst this technique offers some security against attempts to defraud the developer by the use of multiple copies, it offers no protection against the misuse of a single copy of the program in breach of terms of the licence agreement.

A similar protection scheme utilises a hardware "dongle" comprising an electronic circuit storing a particular code which is plugged onto a port of the computer. The program checks the code stored in the dongle against a corresponding code stored within the program, and will only operate in the event of a match. However, this scheme suffers from the same problem as that above first in relation to misuse of a single copy of a program.

SUMMARY OF THE INVENTION

In one aspect, the invention utilises a telecommunications channel to carry validation signals between programmable apparatus and a remote station (for example the software supplier, or a telecommunications network billing centre). In this aspect, security is enhanced by the removal of the store containing the validation data (equivalent to the dongle) from the vicinity of the user, who is therefore unable to disassemble it and learn of its contents for subsequent fraudulent use. Furthermore, since it is possible to determine the point in the telecommunications network at which the apparatus is located and check it against authorised locations, misuse of software by moving the software or the apparatus containing it from one site to another can be reduced.

This embodiment is operable with either downloaded data or with programs (which may be downloaded or supplied by post or over the counter).

In another aspect, a validation process is provided in which validation data is held locally to the apparatus in a local device which is part of a telecommunications network, and the condition of the local device is monitored via the telecommunications network. Thus, although the device is co-located with the apparatus and therefore potentially vulnerable to attempts to disassemble it to learn of its contents, any such attempts can be detected by remote monitoring via the telecommunications network.

In a further aspect, the invention provides a method of charging for the use of apparatus operating a program, in which the program is arranged to perform a security check by transmitting a signal and only continuing to operate when a corresponding encoded signal is received back; in which the exchange of signals gives rise to a billing event which is recorded.

Thus, a program can contain encrypted data, and a local or remote billing device can receive a signal transmitted by the apparatus under the control of the program, and can reply with an encoded authorising signal permitting the use of the program after recording a charge.

The program may be arranged to transmit such a signal giving rise to a charging event when it is first used, or periodically during use, or on use of particular functions. Thus, by use of this aspect of the invention, it is possible to charge for the use of a program according to the time of use or according to the type of use, rather than merely by a one off payment for a licence as at present.

This therefore opens the possibility for program developers to recoup predominantly more of their development costs from heavy users of their programs without overcharging light users.

The same mechanism can be used to charge for the use of downloaded data; in this case, the data access program (for example database connection program or Web Browser program) is arranged to receive encoded use data with the download data, and to initiate a validation signal exchange (and hence a charge event) upon each use of the data, rather than each use of the program.

This may therefore be contrasted with the present manner of controlling access to, and charging for downloaded data in which an initial identifying signal (e.g. a user password) is transmitted from the apparatus to the database host computer prior to transmission of the downloaded data. By way of contrast, the present invention therefore enables ongoing charges to be made for the use of the data subsequent to its downloading rather than a one off payment to be charged prior to downloading of the data.

It will be apparent that the same principle may be extended to provide a mechanism for charging a rental by use of the apparatus itself, rather than the programs or data contained within it. For example, the validation signal exchanging part of the program may form part of the operating system program of the apparatus, so that it is executed whenever the apparatus is switched on or operating. Thus, more flexible methods of charging for the use of computer hardware, or even for peripherals such as printers which are connected to the computer hardware, are enabled.

The same principle may be extended to other types of apparatus held at the premises of a telecommunications user provided that these contain programmable apparatus carrying a stored program (for example a microcontroller carrying an unalterable program held in read only memory to control a washing machine).

In a further aspect, the invention provides a mechanism for charging for the use of different services which are represented on an integrated digital network in the same format. For example, voice services, facsimile services and data services will all appear similar when carried by ATM cells on a high speed digital network. The ability to differentially charge for different services will therefore be difficult to achieve.

Accordingly, in a further aspect, the invention provides apparatus and a method for charging for the use of services carried in a common format on a digital communications network in which the charge is levied on the basis of information which is determined prior to the conversion of the services into the common format.

For example, the local interface for converting a service such as voice telephony or video telephone into a common format is provided at a user's premises, and the interface is operable to issue a charging signal prior to the conversion into the common format. The apparatus of this aspect of the invention preferably makes use of the features of earlier aspects.

Other aspects and preferred embodiments of the invention will be apparent from the following description and claims.

BRIEF DESCRIPTION OF THE DRAWINGS

Embodiments of the invention will now be described in greater detail, by way of example only, with reference to the accompanying drawings in which:

FIG. 14 is a block diagram showing the elements of a system for operating a programmed apparatus for value according to a sixth embodiment to the invention.

DETAILED DESCRIPTION OF EXEMPLARY EMBODIMENTS

First Embodiment

Figure 1:
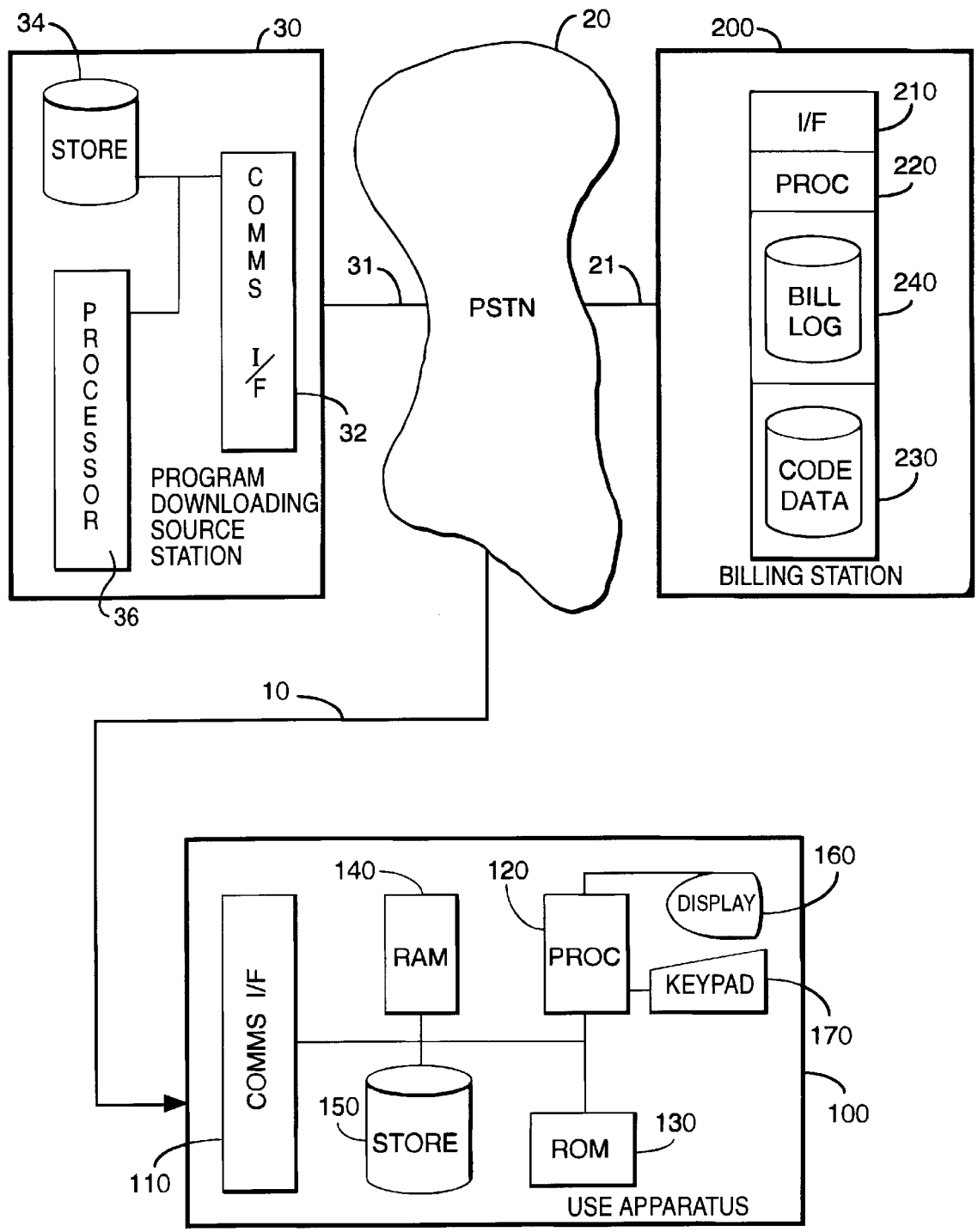
FIG. 1 is a block diagram showing the elements of a system for operating a programmable apparatus for value according to a first embodiment of the invention.

Referring to FIG. 1, in a first embodiment the present invention provides a security and billing mechanism for the use of an applications program (such as a wordprocessor) on a programmable processor apparatus (such as a personal computer or other workstation). In this embodiment, charging information is collected by one or more central charging stations, which are conveniently those used to collect telephone charging information. This embodiment is particularly concerned with charging for the use of programs downloaded via a telecommunications link.

Referring to FIG. 1, a system according to this embodiment comprises apparatus 100 the use of which is to be charged; a communications link 10 linking the apparatus 100 to a telecommunications network 20 (comprising one or more switching nodes via which a plurality of other telecommunications links are accessible); a program downloading source station 30 (for example a mainframe computer coupled to the network 20 via a telecommunications link 31) and a billing station 200 (shown here as being coupled to the network 20 via a telecommunications signalling link 21).

In greater detail, the apparatus 100 comprises a communications interface 110 coupled to the telecommunications link 10 and comprising a modem and associated signalling components; a processor 120 operable under stored program control; and memory for storing the control program for the processor 120. Conveniently, and conventionally, the memory in this embodiment may comprise a read only memory 130 which stores an operating system kernel (e.g. a machine BIOS); a random access memory 140 for storing an active control program; and a permanent memory 150 (a hard disk drive) for storing currently inactive programs and maintaining program storage during power-down of the apparatus 100.

The downloading centre 30 comprises, in greater detail, a communications interface 32 for connection to the telecommunications link 31; a store 34 for storing the program to be downloaded; and a control processor 36 for controlling the operation of the station 30.

General details of the structure of a billing station 200 are to be found in the Journal "British Telecommunications Engineering" Special Issue on Billing, vol. 11 part 4, January 1993. The components necessary for an understanding of the present invention are an interface circuit 210 for receiving and transmitting signalling data via the telecommunications channel 21; a control processor 220 (which may be provided by the mainframe billing computer); a code store 230 storing encoding and verification data; and a billing store 240 in which charging information is stored (which in this embodiment is conveniently provided by the mainframe billing stores used to record telephone charging information for use of the network 20).

The operation of this embodiment will now be explained in greater detail with reference to FIGS. 2 and 3.

Downloading

Figure 2A:
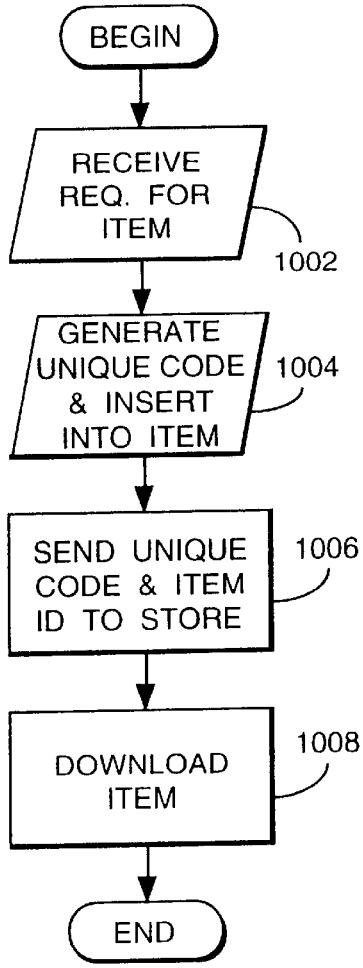
FIG. 2a is a block diagram showing a method of downloading a control program in the embodiment of FIG. 1.

FIG. 2a illustrates the process performed according to this embodiment when a program is downloaded. Initially, the apparatus 100 is connected, via the network 20, to the downloading centre 30 (via, for example, the Internet) under the control of a stored operating system program. On receipt of an instruction via the input device 170, the processor 120 causes the transmission by the communications interface 110 of a signal requesting the downloading of an identified program item.

In a step 1002, the downloading centre receives the request signal transmitted by the apparatus 100. In a step 1004, a unique identifier code (comprising, for example, a lengthy binary sequence generated by a pseudo random number generator) is generated to uniquely identify this downloaded copy of the program, and the program is read from the store 34 to create a copy which is modified to insert the identifier code. In a step 1006, the unique identifier code, together with the telephone number (or other identification data) identifying the requester, are transmitted via the network 20 to the billing station 200. In a step 1008, the program (including the unique identifier code) is transmitted in serial fashion via the network 20 and links 31 and 10 to the apparatus 100, at which it is received via the communications interface and stored in the permanent store 150.

Validation

Figure 2C:
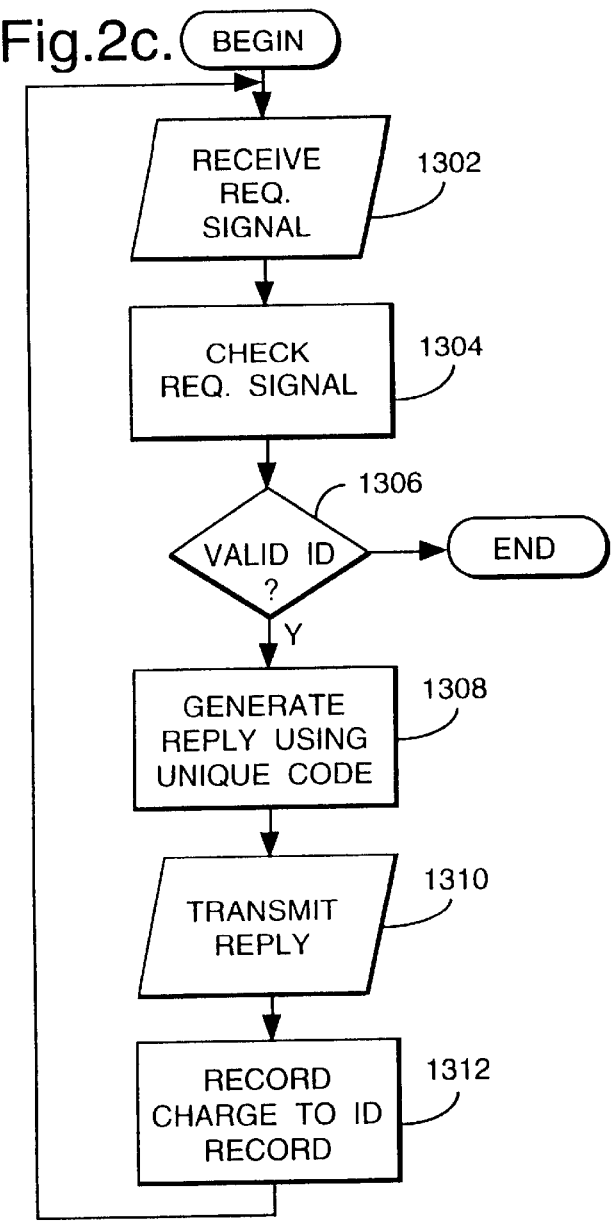
FIG. 2c is a flow diagram showing the operation of a billing station in the embodiment of FIG. 1.
Figure 2B:
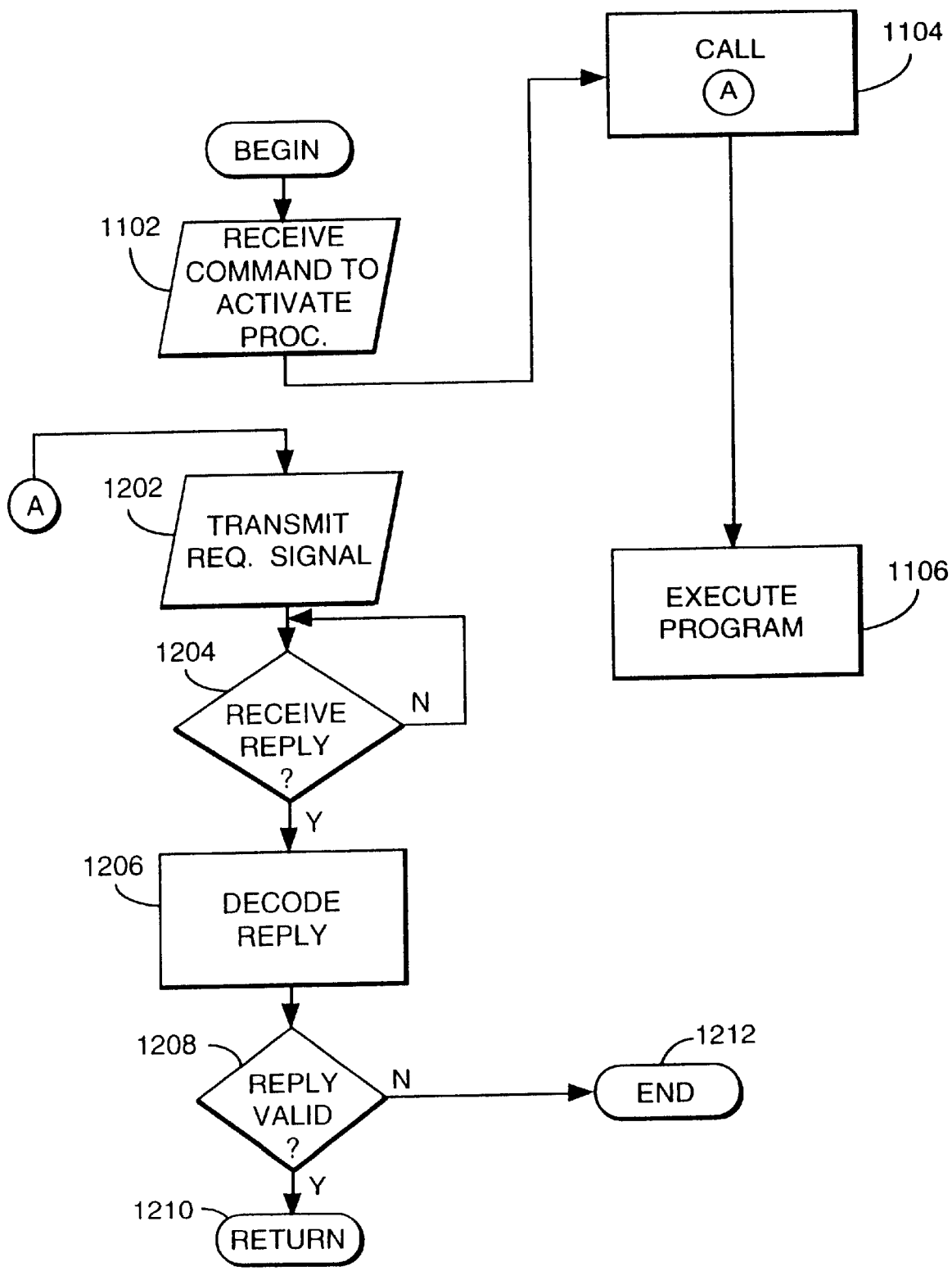
FIG. 2b is a flow diagram showing the operation of the programmed apparatus of the embodiment of FIG. 1.

In this embodiment, the program contains code for performing the process shown in FIG. 2b, which provides a validation process by each use of the program. In a step 1102, when the program is activated, prior to normal execution of the functions of the program (step 1106) in a step 1104, a validation routine is called. In the validation routine, in a step 1202, a use request signal is transmitted to the network 20. The use request signal has a format which will cause it to be directed by the network 20 to the billing station 200. For example, where the link 10 is an ISDN link comprising 2 "B" (64 kilobit per second) data channels and a "D" (16 kilobit per second) signalling channel, the use request signal comprises a data packet consisting of a header portion (indicating that this is a use request packet to be directed to the billing station 200); and a data portion (indicating the identity of the application program to be used).

Although it is not essential, it is preferred in this embodiment that the data portion should be encrypted for additional security. To ensure that the encrypted data portion differs on subsequent use request signals from the same apparatus, the data portion prior to encryption may comprise additional, time varying, data such as the date.

In a step 1204, it is determined whether a reply has been received from the telecommunications link 10 (for example, a packet received on the D channel of an ISDN link 10 the header portion of which identifies it as a return message). In the absence of a reply, no further execution of the program is performed. It may be convenient to provide an exit from the program after a predetermined time (for example on the order of several minutes).

When a reply is received, in a step 1206 the data portion of the return message is decrypted by performing a predetermined decryption algorithm thereon, and the result is compared with the stored unique code in step 1208. If the two correspond, the processor returns in a step 1210 to execute the application program in step 1106. If the two do not correspond, in a step 1212 all further execution of the application program is ceased.

It may be convenient to provide that, after a predetermined number of invalid replies are received, the program is arranged to erase or override a portion of the copy of itself stored on the permanent store 150, or otherwise to render itself inoperable, and to indicate that this has occurred on the output device 160.

Billing

Referring to FIG. 2c, the operation of the billing station 200 in this embodiment will now be described in greater detail.

On receiving a use request signal (previously transmitted in step 1202) in step 1302, the billing station 200 determined the identity of the transmitting apparatus 100; in this embodiment, for example by determining the telecommunications link 10 via which the use request signal was transmitted (using conventional calling line identification techniques). This information may also be appended to the header portion of the use request signal by the first node encountered within the network 20, for instance.

In a step 1306, the control processor 220 reads the code data store 230 to determine whether the identity corresponds to an identity stored therein (on the basis of data previously transmitted from the downloading station 30) with a corresponding unique code word indicating a right to use the applications program. In the event that a corresponding entry is found in the code data store 230, the processor 220 is arranged to generate a reply in step 1308, by encrypting the unique code using an encryption process which can be decrypted by the decryption process performed in the apparatus 100. Preferably, the encrypted return message is arranged to vary, for each apparatus 100, over time; this may be achieved, for example by encrypting time variable data such as the date together with the unique code.

In a step 1310, the return signal thus generated is provided with a header to cause it to be routed by the network 20 to the apparatus 100 and is transmitted back to the apparatus 100.

In the event that the identity of the apparatus 100 is not found to be valid in step 1306, no return signal is generated (it would alternatively be possible to generate a predetermined invalid return signal).

In a step 1312, a charge record is recorded in the billing store 240. For example where calling line identification has been used, the record may be recorded in the entry under the identified telephone number. In this embodiment, the charge record comprises date and time information, an indication of the requested program (received in the use request signal or derived therefrom), and an indication of a unit charge for the use of that program.

Thus, the above described embodiment is operable on each occasion that an attempt is made by a user of the apparatus to use the downloaded program. On each such attempt, the identity of the user is checked (by confirming his telephone number). If the identity is not acceptable, no return signal will be sent and the program will not operate. On each occasion when a return signal is transmitted, a charge is made for the use of the program.

Billing by Time

Preferably, in addition to charging on each occasion when the downloaded program is used, a charge is also made based on the period of use of the program. This is achieved, as shown in FIG. 3, by performing a call to point A at the start of the verification routine of FIG. 2*b* on each occasion when a predetermined interval of time ΔT has elapsed (for example, every five minutes). FIG. 3 illustrates a time test step 1108 at which the program periodically reads a real time clock (not shown) of the apparatus 100 and calls the verification routine in a step 1110 on the elapsing of the predetermined time. It may, however, be more convenient for the program to set the real time clock of the apparatus 100 to generate an interrupt after the predetermined time ΔT, and to perform step 1110 in response to the interrupt.

The operation of the billing station 200 is substantially unchanged, except that rather than recording a sequence of successive different charge entries in successive repetitions of step 1312, successive charge event signals may be generated in repetitions of step 1312, which are accumulated and recorded as a single charge entry comprising a single date and time, and a charge consisting of the product of the number of charging events thus generated and a predetermined charging rate for use of the program.

This embodiment offers some protection against fraud. Where the fraud consists of making a copy, the fraudulent user will be unable to use the copy from any other establishment, since a calling line identification technique is used which will respond only to access from the original user's correct telephone line.

Since the return signal is arranged to vary over time, it is not possible for a fraudulent user who has a copy of a program merely to tap the communications link 10 and record the return signal for subsequent simulation, nor (due to the encryption) is it possible to predict what the return signal should be on the basis of recordings of previous return signals.

It might well be possible to de-compile portions of the program, study its function and thus defeat this verification and charging mechanism of this embodiment, but the effort in so doing should deter unskilled or opportunistic fraudsters.

Rather than varying the data to be encrypted over time, it would be possible to vary parameters of the encryption process (and the corresponding decryption process). In the same manner, rather than distributing a unique code for each copy of the program, it would be possible to distribute a unique decryption algorithm in each program and a corresponding encryption algorithm to the billing station 200.

Second Embodiment

The second embodiment in general fulfils the same function as the first, and like steps and components will be given the same reference numerals and will not be described further. For convenience, several differences from the first embodiment are here described together, but it will be realised that each difference could be used with the features of the first embodiment (or other embodiments) and separately of each other. Specifically, the second embodiment differs from the first in the following respects:

1. Billing is performed at the downloading centre by the downloading entity, rather than at the billing station by the network operator.
2. Use of the program is charged by reference to use of particular functions or sub programs instead of (or in addition to) charging by time.
3. Use request messages are generated in a progressing series and, conveniently, return messages are generated by encrypting the use request messages.
4. Use is monitored over time.

Figure 4:
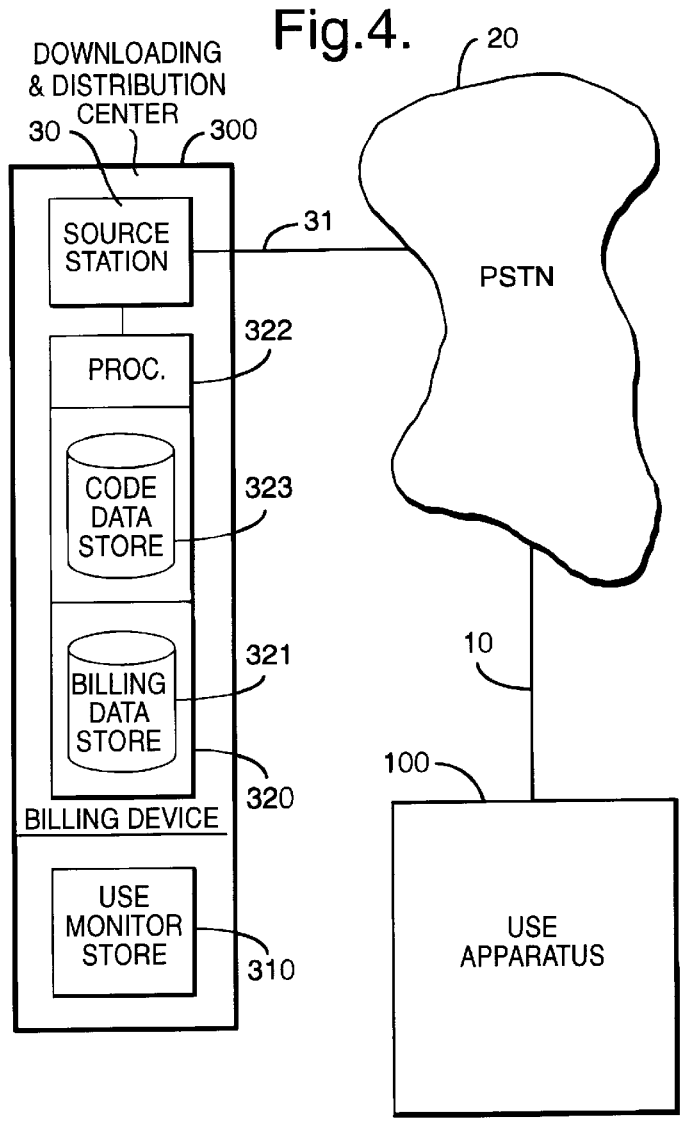
FIG. 4 is a block diagram showing the elements of a system for operating a programmable apparatus for value according to a second embodiment of the invention.

Thus, referring to FIG. 4, in this embodiment the downloading and distribution centre 300 comprises a downloading centre 30 substantially as described above; a use monitor store 310; and a billing device 320 comprising a billing record store 321 and a processor 322. It would, of course, be possible to provide the billing station 320 at a separate physical location to the downloading station 30. However, conveniently, the processor 322 is in fact provided by the control unit 36 of the downloading station 30, and the signalling interface 32 serves also the billing device 320.

Validation and Billing

In this embodiment, the use request signals generated by the apparatus 100 carry an address portion causing them to be routed to the telecommunications link 31, and the signalling interface 32 routes use requests to the processor 322, to be verified according to the process of FIG. 2*c*. The apparatus 100 operates generally in accordance with FIGS. 2*b* and 3 as described above, except as modified with reference to FIG. 5 below. The downloading centre 30 operates substantially as described above in relation to FIG. 2*a*, except that in the step 1006, it is not necessary to physically send code and identification data to a separate billing station but merely to record them in the code data store 323.

Figure 5:
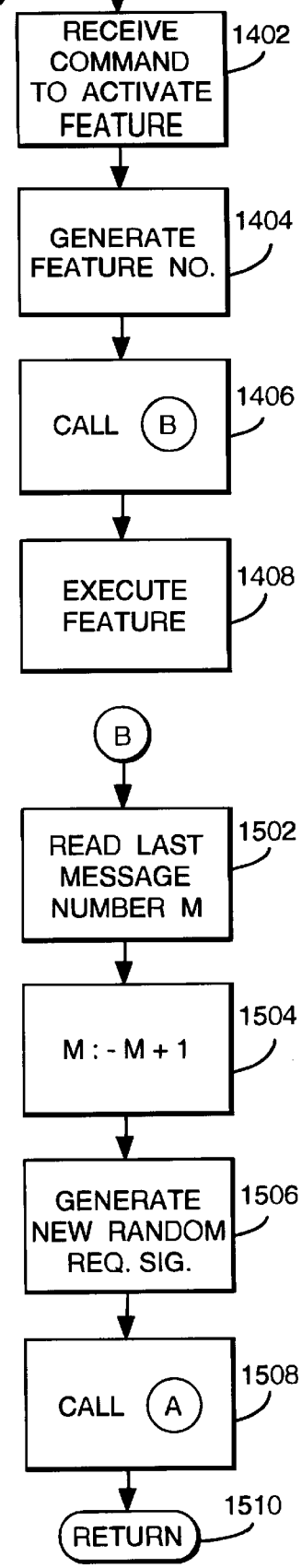
FIG. 5 is a flow diagram modifying the operation of FIGS. 2b and 3 in a first example according to the second embodiment.

Referring to FIG. 5, in addition to the charge events which are generated on activation of the program (as in FIG. 2*b*) and on elapsation of a predetermined time of operation (as in FIG. 3), in this embodiment, in step 1402, on each occasion when a particular program feature, sub program or sub routine (for example, the spell check feature in a wordprocessing program) is invoked, data indicating the identity of the feature is generated in step 1404, and in step 1406, a call is executed to the sub routine commencing at point B (step 1502). The operation of the apparatus 100 in performing FIGS. 2*b* and 3 is also modified in this embodiment to call the sub routine of step 1502, rather than that of step 1202, at steps 1104 and 1110.

In step 1502, the processor 120 reads a message number M stored at a predetermined location on the permanent store 150, and in step 1504, the number is incremented and rewritten to the permanent store 150.

The message number M is preferably incremented only where a valid return signal has been received.

In step 1506, a use request signal data portion is generated by encryption of the feature number and the message number M, the encryption scrambles the data so that the encrypted data portion bears no resemblance to that generated for the previous message number M.

In step 1508, the process of the validation sub routine commencing at step 1202 of FIG. 2*b* is executed, so as to transmit the use request message.

At the billing device 320, the process of FIG. 2c is performed; in this embodiment, in the step 1304 after decryption of the use request message data portion, it is determined whether the unique code is a valid code and, if so, whether the message number M follows in sequence after the last received message number. If so, the identity is judged to be valid.

It is also determined whether the unique code corresponds to a user who is entitled to use the feature corresponding to the received feature number. For additional security, calling line identification may also be performed in this embodiment as in the first, but this is not essential.

Where the received use request message is verified as valid in step 1306, in step 1308 the return authorisation message is generated utilising the received unique code and message number, and a different encryption process to that used by the apparatus 100 in step 1506. The corresponding decryption process is utilised in step 1206, and in the event that upon decryption the unique code matches that stored within the program, the processor 120 executes a return from step 1210 to step 1510 to step 1408, and proceeds to execute the desired program feature.

Use Monitoring

On each occasion when a feature is used in this manner, a record is stored in the use monitor store 310, indicating the identity of the user and of the feature. Preferably, any further available information about the apparatus 100 is also stored. The records held in the usage monitor store 310 are periodically analysed and used in one or more of the following ways:

1. The relative usage of different features of a program is determined. This may be used in developing further improvements or modifications to the program (and such usage data may be further analysed by reference to the types of apparatus 100 using the program);
2. A long term pattern of the amount of use made by each user of the various features of the program may be built up. This may then be used to detect radical changes (when averaged over a relatively short period of time, on the order of weeks) in the use pattern of a user to detect fraudulent practices such as the use of multiple copies of the same program, or the transfer of the program to a different user (with a different use pattern).

Thus, in this embodiment, the supplier of the program is able to bill for its use, and signalling communication between the downloading centre and a separate billing station is unnecessary. It would, of course, be possible for this latter advantage to be achieved by integrating the function of the downloading station 30 into the central billing station 200 of a telecommunications network, rather than vice versa.

The use of a time varying series of use request messages prevents the fraudulent recording and reuse of a single use request message.

Furthermore, the recording of the message number on permanent storage media in the apparatus 100 ensures that even after the apparatus 100 is switched off and then switched on again the sequence is continuous. This is effective in preventing the use of multiple fraudulent copies of a program, since if two or more copies of a program are used, the message number stored in at least one of the apparatus 100 will be lower than the last message number received by the billing station 320, so that only one copy of the program will be operable.

Charging for the use of different features enables program developers to apportion royalty payments between multiple contributors to a program, as well as permitting charging structures which accurately reflect the development costs of different parts of a program. It also makes possible the downloading of upgrades to software with a separate and additional charge for the use thereof. Furthermore, it enables program suppliers to determine the popularity or otherwise of different functions or sub programs.

Rather than using the charging events to generate a charge to the user of the apparatus, in some circumstances the user of the apparatus may have pre-paid in advance (for example by payment of a one off fee) and the charging events may be used solely to calculate payments to be made to the contributors to a program. For instance, the originator of a spell check module may be credited a certain amount on each occasion when the spell check module is used by the remote user.

In this embodiment, as in the first, a charge may be made on the basis of elapsed time. In this case, the charge may be at a different rate for different functions; thus, in invoking a function, the length of the time interval $\Delta T$ may be set in dependence upon the function. Thus, the billing station 320 may accumulate a single tariff amount for each charging event, the charging events occurring at different rates for different parts of the program.

Third Embodiment

In the third embodiment, the system of the first (or second) embodiment is varied so that historical billing information is held in a billing apparatus local to each user, in the manner of a usage meter, rather than being held centrally in a telecommunications billing station 200 or program supplier billing device 320.

Figure 6:
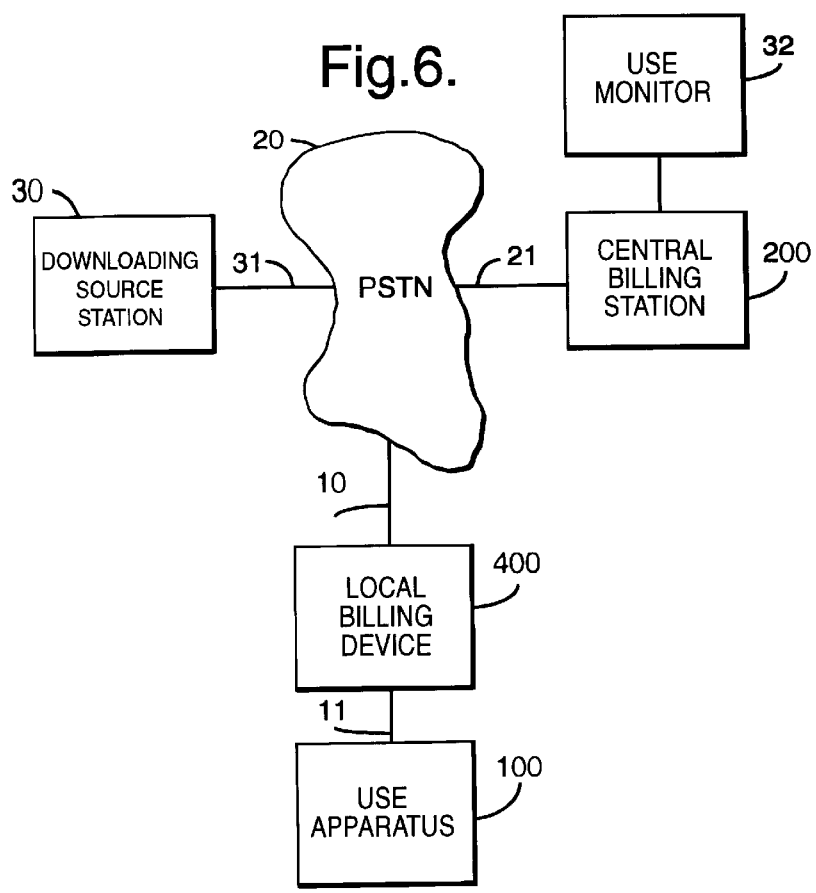
FIG. 6 is a block diagram showing the elements of a system for operating a programmable apparatus for value according to a third embodiment of the invention.

Referring to FIG. 6, in this embodiment, the apparatus 100 is connected via a local communications link 11 to a local billing device 400, which is connected via the line 10 and network 20 to the central billing station 200 and downloading station 30 of the first embodiment. Preferably, in this embodiment, the usage monitoring store 320 of the second embodiment is provided, in communication with the central billing station 200.

Figure 7:
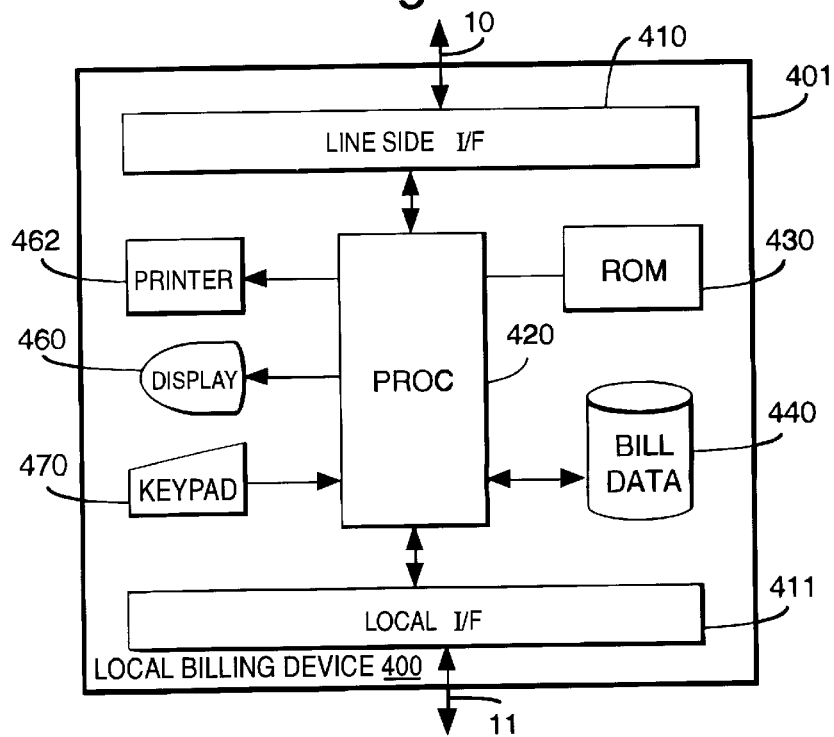
FIG. 7 is a block diagram showing the elements of a local billing device in the embodiment of FIG. 6.

Referring to FIG. 7, each device 400 comprises a robust housing 401, and is provided with a fail to safe control system which permanently disables the device on detection of an attempt to tamper, and with tamper proof seals which make it evident when tampering has occurred.

Within the housing 401 are a local interface circuit 411 connected to the local communications link 11 and a line side interface circuit 410 connected to the telecommunications channel 10. In communication with the interfaces 411, 410 is a processor 420 (for example a microcontroller or microcomputer) operating in accordance with a stored program held in a read only memory 430. The processor 420 is connected to a display panel 460 (for example a liquid crystal display) to generate a display thereon of billing data, a printer 462, and a keypad 470 from which it is arranged to accept input instructions to control the data displayed on the display 460. Also provided in this embodiment is a local billing data store 440, which is conveniently static RAM or EPROM.

Downloading

The downloading in this embodiment is similar to that of the first embodiment, and only the differences therefrom will be explained. The local billing device 400 is generally transparent to transmissions between the apparatus 100 and the network 20, but the processor 420 is arranged to monitor all data communicated in either direction. On detecting the downloading of a program, the processor 420 creates a program record in the billing data store 440 for the downloaded program.

Validation

In this embodiment, the validation is conveniently performed as in the first embodiment. The local billing device 400 in this embodiment does not play a part in the validation process, and the processor 420 merely provides a transparent link between the interfaces 410 and 411 for the use request and authorisation messages.

Billing

In this embodiment, charge records are held locally rather than centrally. However, bills are generated centrally. Accordingly, this embodiment differs from the first embodiment in that the processor 220 of the central billing station 200 is arranged to store, for each user, a simple running total of the amount due for usage of the program, which total is incremented on each charging event.

The processor 420 of the local billing station 400 is arranged to detect each occurrence of an authorisation signal (and hence each charging event) and to log the charging events in the record created for the program in the billing data store 440 on downloading of the program as described above. Thus, the local billing device 400 keeps a complete transaction log locally. The processor 420 is arranged to accept a command from the keypad 470 to display the log, together with the associated total charge, on the display device 460, so that the user of the apparatus 100 may monitor the level of charges.

Bill Generation

Periodically (for example once a month or once a quarter) the central billing station 200 is arranged to print a bill for the total amount due stored in its record for each of the apparatus 100. The central billing station in this case is arranged to generate to all local billing apparatus 400 to cause the processor 420 thereof to print out the log stored in the local billing store 440 for the use of the apparatus 100, in the form of a statement.

Various modifications may be made to the operation of this embodiment. For example, as in our earlier European application 943089904 U.S. patent application Ser. No. 08/849,409, filed Jun. 27, 1997pending May 13, 1998 Sep. 29, 1999 still pending, a limited amount of call record data may be held in the store 240 at the central billing station and a reconciliation performed between the records held in the central billing station and the local billing stations 400.

Alternatively, rather than generating a statement locally, on receipt of a bill generation signal from the central billing station 200, the local billing device 400 may transmit the accumulated transaction log from its billing store 440 to the central billing station (this does, however, entail a higher volume of data being transmitted through the network 20).

Since in this embodiment the total amount due is stored centrally, with only descriptive data being held locally, attempts to tamper with the local billing device 400 will not in general lead to a loss of revenue, but merely to the possibility for disagreement between the user of the apparatus and the operator of the central billing station 200.

However, nonetheless, the security of this embodiment may be increased by providing that the processor 420 is arranged to further encrypt use messages received at the interface 411 before retransmitting them on the interface 410, and to decrypt authorisation messages received at the interface before passing them on to the interface 411.

Correspondingly, the central billing station 200 is arranged to perform corresponding additional encryption and decryption stages. Thus, it is not possibly simply to bypass the local billing device 400, since the signals passing along the communications channel 10 include an additional stage of encryption relative to those passing along the local link 11.

Although the above described embodiment has been illustrated with reference to the first embodiment in which a central billing station is provided, it will be readily apparent that the local billing station could equally well communicate with the downloading centre 30 at which the validation and billing could be carried out as in the second embodiment, rather than at the central billing station 200 of the first embodiment.

Finally, instead of maintaining a running total of the amount due for the use of each apparatus 100 in a central billing store 240 (or a billing store at the downloading centre of the second embodiment) it would be possible, in this embodiment, to store all charging information locally.

In this case, at periodic intervals (for example monthly or quarterly), or when the total charge reaches a predetermined level, the processor 420 is arranged to transmit billing data comprising at least the total due to the central station (or downloading station) for the generation of a bill. If no central record of the amount due is maintained, then the physical security (geographical location and strength of the housing 401) of the local billing device 400 is of greater importance.

Fourth Embodiment

In the above described third embodiment, the validation and authorisation stages were performed by the exchange of encoded signals between the apparatus 100 and a remote point (the central billing station 200 or downloading centre 230) via the telecommunications network 20, as in the first and second embodiments respectively, whereas some or all of the charging data was stored in the local station 400.

In this embodiment, however, the local billing device 400 is arranged to perform the validation and authorisation signalling as well as (or, in principle, instead of) maintaining local charging records.

In this embodiment, to avoid potential attempts to defraud the program supplier, by tampering with the local billing device 400, the continued operation of the local billing device 400 is continually monitored via the network 20.

Figure 8:
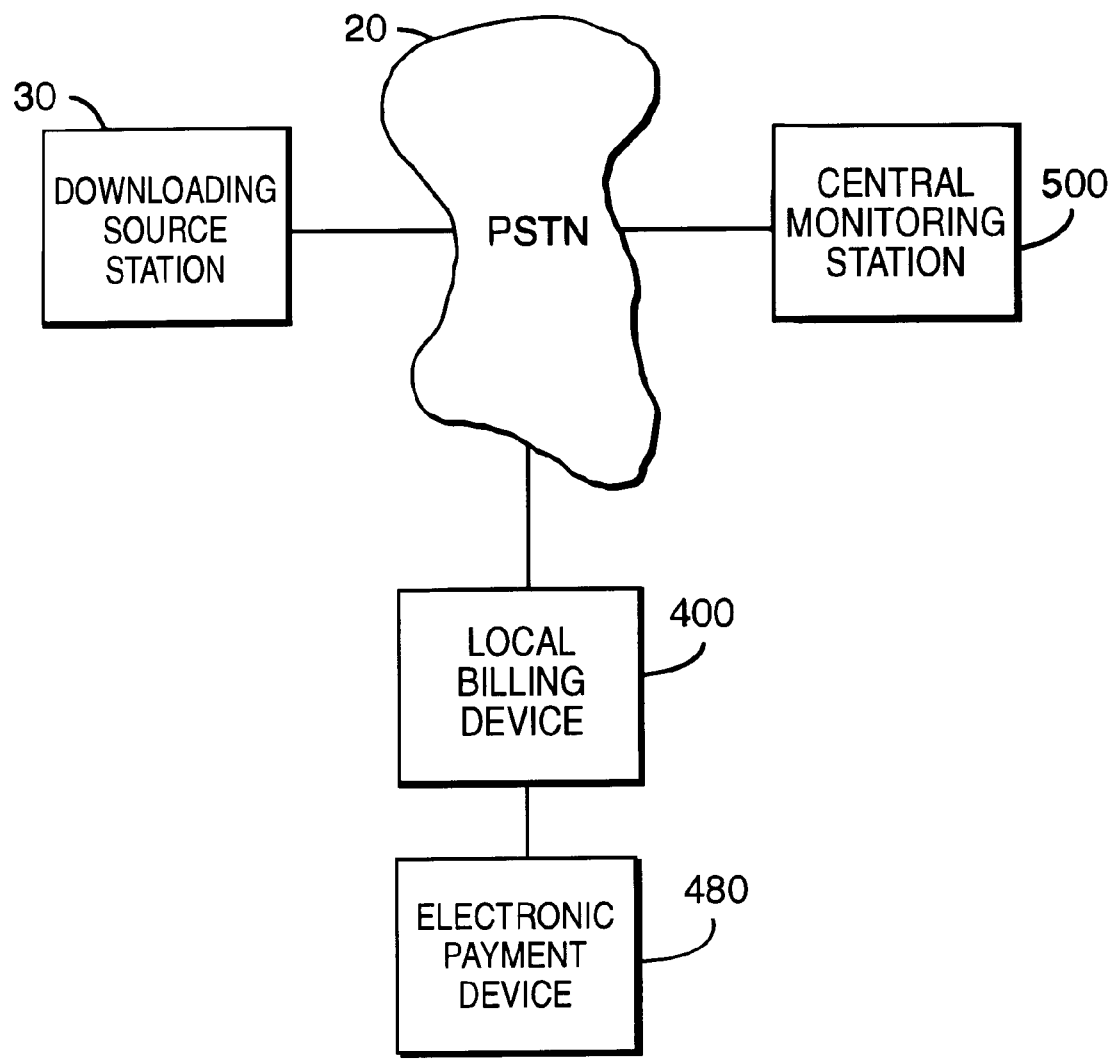
FIG. 8 corresponds to FIG. 6 and is a block diagram showing the elements of a system for operating a programmable apparatus of value according to a fourth embodiment of the invention.

Referring to FIG. 8, in this embodiment, the central billing station 200 is replaced by a central monitoring station 500, which is arranged to monitor the correct functioning of the local billing device 400.

Figure 9:
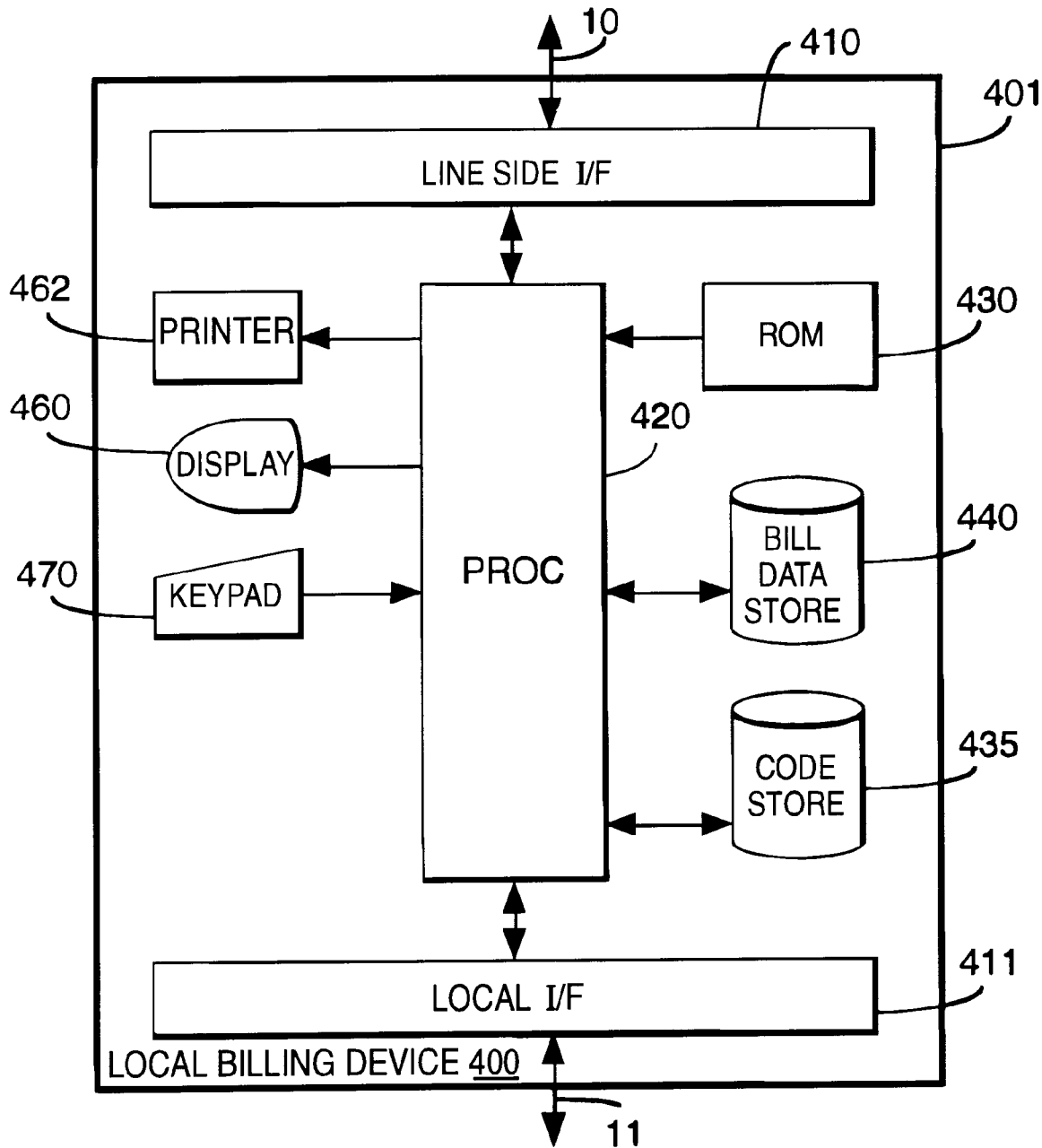
FIG. 9 corresponds to FIG. 7 and is a block diagram showing the elements of a local billing device in the fourth embodiment of FIG. 6.

Referring to FIG. 9, in this embodiment, the local billing device 400 operates generally in accordance with the third embodiment illustrated in FIG. 7, but additionally includes a code store 435 (functionally corresponding to the code store 230 of the first embodiment).

Downloading

In this embodiment, as in the first embodiment a program is downloaded generally according to the process shown in FIG. 2*a*. However, rather than sending the unique code to the central billing station 200 of the first embodiment, it is transmitted (preferably in a preliminary transmission) to the local billing device 400, as is the program. The presence of the unique code is recognised by the processor 420. The local billing device 400 receives the unique code and stores it in the store 435. The downloaded program is transmitted onto the apparatus 100, whereas the unique code is not.

Validation

The validation process in this embodiment operates as described above in relation to the first or second embodiments, but with the processor 420 performing the function of checking the validity of the use request signal received from the apparatus 100, by reference to the code stored in the code store 435, and transmitting back an authorisation signal to permit operation of the apparatus 100, as will be described in greater detail below.

Billing

On each occasion when an authorisation signal is returned to the apparatus 100, a charging event occurs, and a corresponding record is recorded in the store 440, as in the third embodiment.

The operating condition of the local billing unit 400 is periodically monitored. In greater detail, referring to FIGS. 10 and 11, in a step 1650 the processor 420 checks for receipt of a use request signal at the interface 411 from the apparatus 100. If a use request signal is received, in step 1652 the processor 420 accesses the code stored for the program in the store 435, and in step 1654 it checks the validity of the use request signal.

If no signal was received in step 1650, or if an invalid signal was received (step 1654), in step 1656, the processor 420 determined whether a predetermined period of time has elapsed since a monitoring signal was last sent to the monitoring station 500. The period of time $\Delta t$ may be on the order of several minutes; at any rate, it is sufficiently short that a fraudulent user cannot within the period dismantle the local billing station 400 and circumvent the operation of the processor 420.

Figure 11A:
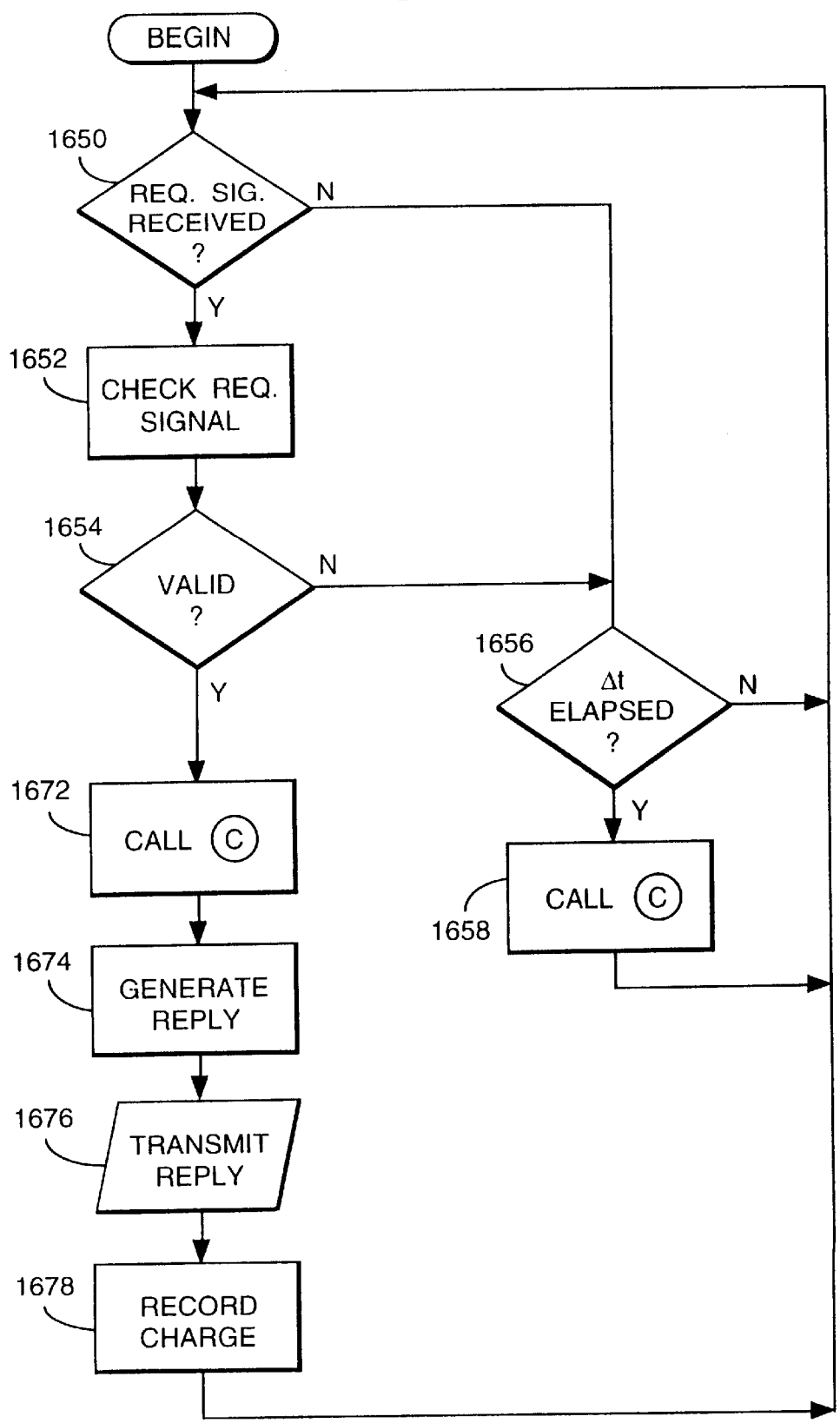
FIGS. 11a and 11b are flow diagrams showing the operation of the device of FIG. 9 according to the fourth embodiment.
Figure 11B:
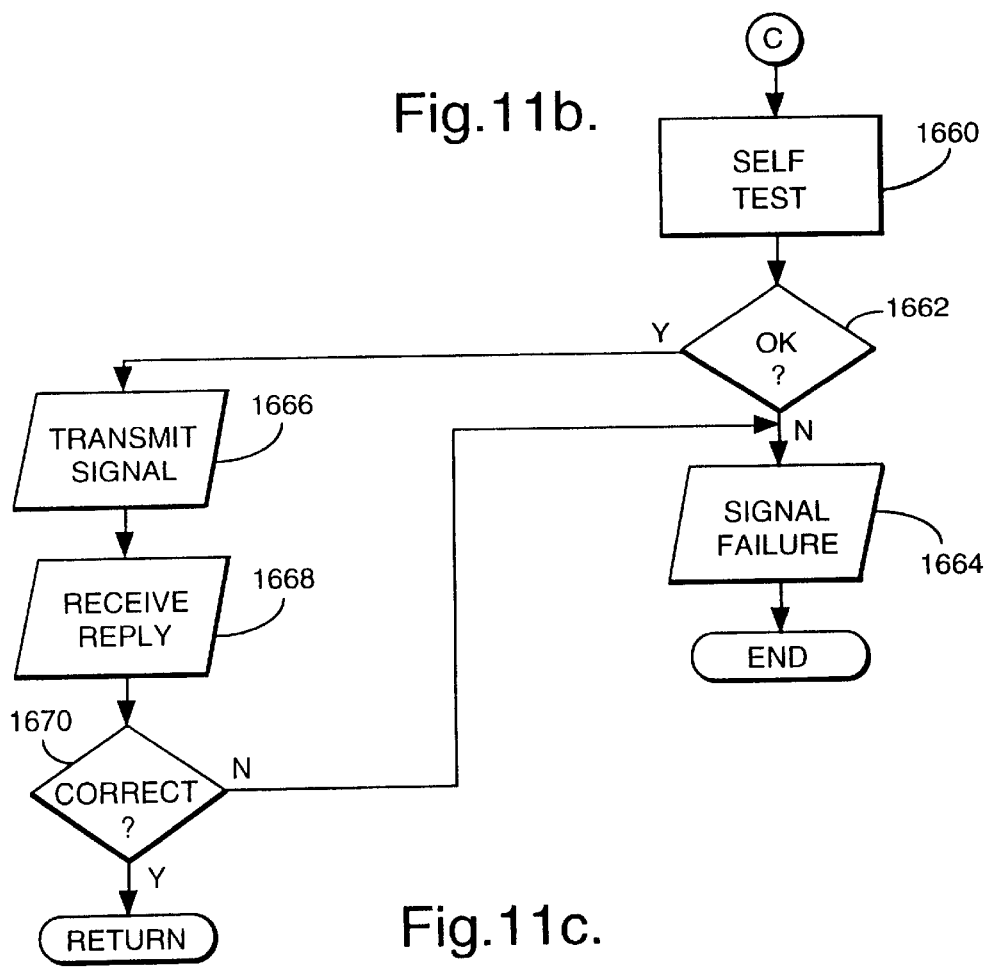

If the predetermined period has elapsed, then in step 1658, the processor performs the monitoring routine of FIG. 11b. In a step 1660, the processor 420 performs a self-test to determine whether it is functioning correctly, and to determine whether the housing 401 is still closed. In a step 1662, the results of the self test are assessed and, if the self test indicates defective operation, in a step 1664 the process 420 sends (or attempts to sends) a failure signal by the interface 410 to the monitoring station 500, and terminates operation.

If the self test indicates no failure, in a step 1666 the processor 420 generates a condition monitoring signal which is transmitted via the interface 410 to the monitoring station 500. Preferably, the condition monitoring signal comprises encoded data selected from a non repeating sequence known both to the local billing device 400 and the condition monitoring centre 500, in the same manner as described above in the second embodiment.

Figure 11C:
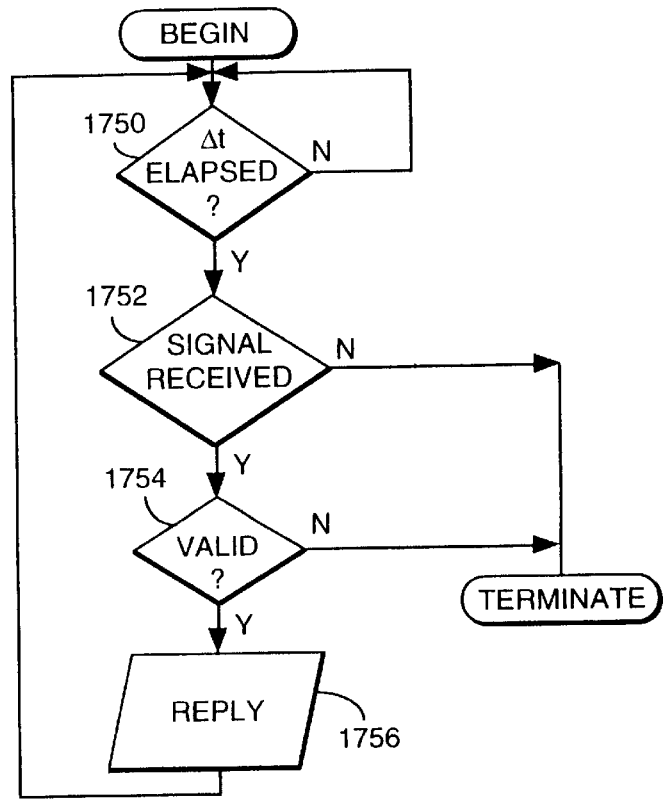
FIG. 11c is a flow diagram showing the operation of a remote monitoring station of the fourth embodiment.

Referring to FIG. 11c, in steps 1750 and 1752, the central monitoring station 500 determines whether a condition monitoring signal has been received within the predetermined time $\Delta t$, and if not, then the local billing device is recorded as being faulty. If a signal has been received, in a step 1754 the monitoring station 500 determines the validity of the signal by decoding the signal and determining whether it follows in the predetermined sequence; if not, then as before the local billing device 400 is recorded as being faulty. If the received signal is valid, then an encrypted reply (based, as described above, on the received signal) is transmitted back in a step 1756.

Figure 10:
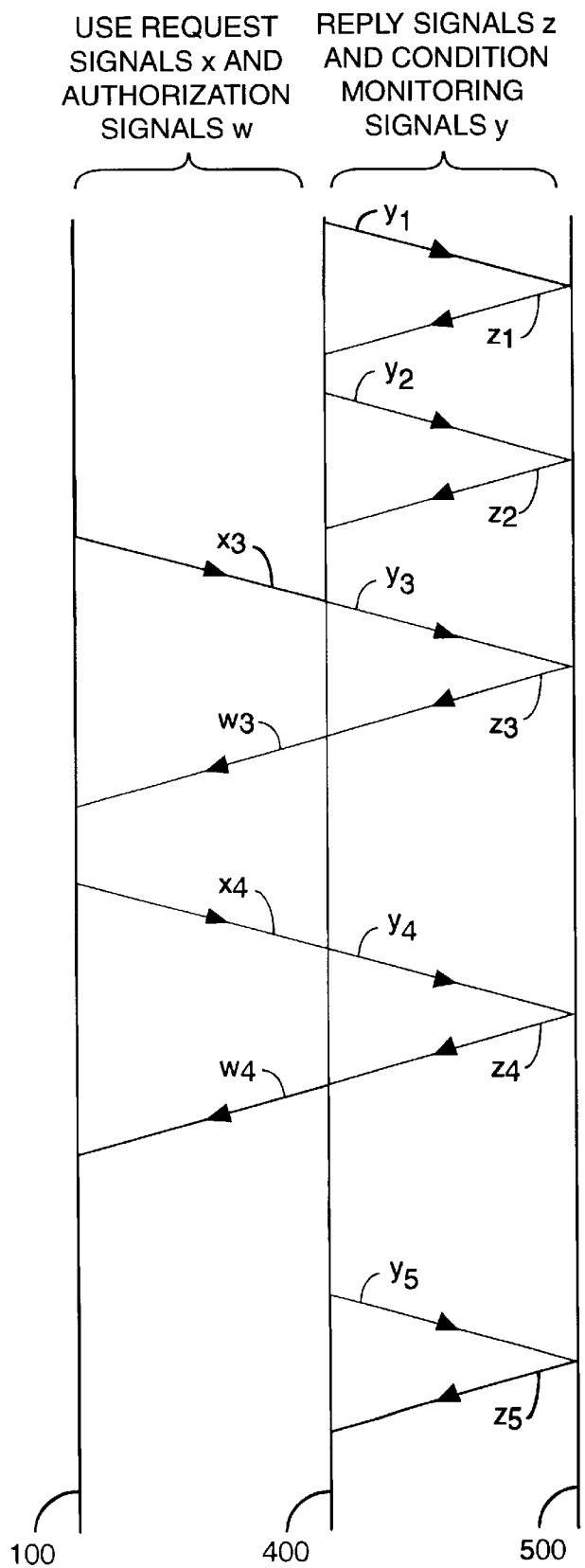
FIG. 10 is a signal transmission diagram showing transmission of signals in the fourth embodiment.

Thus, as shown in FIG. 10, periodic condition monitoring signals $y_1$–$y_5$ are transmitted from, and periodic reply signals $z_1$–$z_5$ are received by, the local billing device 400.

Referring once more to FIG. 11b, in step 1670, on receipt of the reply signal transmitted from the central monitoring station 500, in step 1668, the processor 420 is arranged to determine whether or not the reply signal is valid, by decoding the reply signal and testing whether it corresponds to the signal transmitted in step 1666. In the event that the reply signal is incorrect, an attempt to tamper with the line 10, the network 20 or the local billing device 400 is likely. Accordingly, the processor 420 performs the step 1664 as described above.

When a valid reply signal is received, the processor 420 returns to its departure point in FIG. 11a.

Referring to FIG. 11a, on receipt of a valid use request signal $x_3$–$x_4$, in step 1672, the processor 420 is likewise arranged to perform to the processor of FIG. 11b and, in the event that a valid reply signal is received as described above, in a step 1674 the processor 420 generates an authorisation signal $w_3$–$w_4$ as in the first or second embodiments, and transmits the authorisation signal back to the apparatus 100 in a step 1676. In a step 1678, a corresponding charge event is stored in the billing record store 440.

Thus, in this embodiment, the validation process is performed locally to the apparatus 100, somewhat in the manner of a conventional dongle.

However, rather than being held in an item of hardware the property of the user, the validation information is held in a local billing station which is the property of the telecommunications operating entity operating the network 20, and which can receive new security and validation information via the network 20. Thus, on downloading an upgrade or alteration to a program, a new unique code can be supplied to the local billing device 400 so that fraudulent users who may have acquired knowledge of the previous unique code are not able to use the update. Even when no update is transmitted, the downloaded program may be arranged to periodically require a new code and the new code may periodically be transmitted from the downloading centre 30 to the local billing device 400.

Furthermore, and quite unlike existing security measures, the exchange of security information is used to generate billing events (as in the first and second embodiments) which are then locally recorded.

The connection of the local billing device 400 to the telecommunications network 20 enables remote monitoring of the condition of the local billing device 400 to be performed, which thus reduces the possibility of attempts to tamper with the local billing device, by periodic self test and transmission of signals to the remote monitoring device 500. Attempts to tamper with the link 10 to defraud the local billing device 400 are defeated by the provision of return messages from the remote monitoring device 500.

As in the third embodiment, at periodic intervals (for example once a month or once a quarter) the local billing device 400 transmits a total due signal, indicating the amount of payment due, via the line 10; conveniently, in this embodiment, the signal is transmitted to the downloading station 30 (the originator of the program) which is therefore able to charge the user.

If the bill is not paid, the downloading centre 30 signals to the remote monitoring centre 500 to cease further communication with the local billing device 400, which therefore ceases to receive return messages and ceases to transmit authorising signals to the apparatus 100, preventing further use of the program until the bill is paid.

As in the third embodiment, in this embodiment the local billing device 400 is arranged to display totalised charges to the user, or to print them out, on request via the input device 470.

As in the third embodiment, the local billing device may transmit transaction details, rather than just the total due, to the downloading station 30.

In an alternative arrangement according to this embodiment, rather than accumulating billing information, the local billing device 400 may be equipped with a means for receiving electronic payment (for example a smart card reader) and may debit a users payment device 480 (for example smart card) on each charging event. In this case, the local billing device 400 utilises the telecommunications network 20 to perform the electronic payment signalling (according to, for example, the MONDEX(™) payment system).

Bills can be generated either on reaching a locally met threshold or on a time basis (e.g. monthly or quarterly).

Fifth Embodiment

In the preceding embodiments, the program operating the apparatus 100 was arranged to generate an exchange of signals corresponding to charging events for use of the program. In this embodiment, on the other hand, the program is a database access or other information retrieval program (specifically, for example a Web Browser program such as World Wide Web(™) or Mosaic(™)), and charges are made for the use of downloaded information rather than for the use of the program.

In some cases, the price to be charged for retrieval of a file of data is known in advance. In such cases, the apparatus may follow the process of FIG. 12 (which is a modification of that of FIG. 5).

Figure 12:
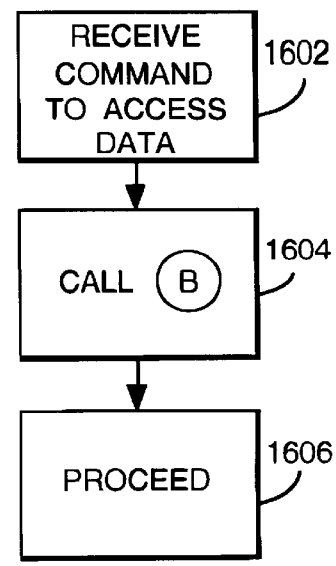
FIG. 12 is a flow diagram modifying the operation of FIG. 5 according to a first example of a fifth embodiment of the invention.
Figure 13:
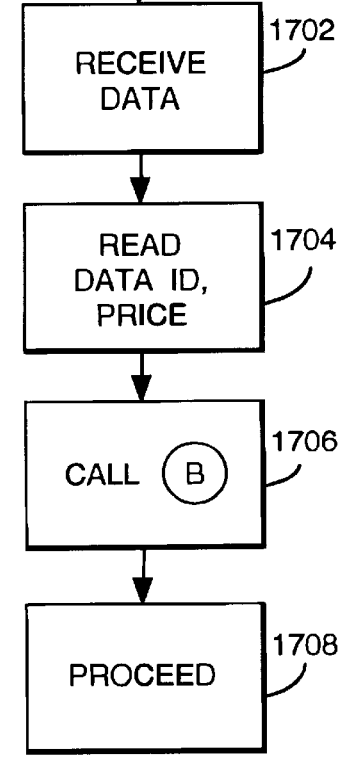
FIG. 13 is a flow diagram modifying the operation of FIG. 5 according to a second example of the fifth embodiment of the invention.

In FIG. 12, on receipt of an instruction (step 1602) to download predetermined data, the routine of step 1502 of FIG. 5 is performed. In step 1604 the arrangement of the system may be either according to FIG. 1 or FIG. 4. The billing device follows the process of FIG. 2c, and the apparatus 100 that of FIGS. 2b and 5 a modified by FIG. 7.

If the user is verified as being authorised to access the data, and after generating a billing event signal, in step 1606 the program proceeds to download the data.

In general, the price to be paid for use of data may not be known in advance to the program. In this case, the program is arranged to execute the process of FIG. 8. In this case, downloaded data for the use of which a charge is to be made contains a file header indicating the charge, together with an indication of the identity of the data (e.g. the World Wide Web page number). When the program downloads the data in step 1702, via the telecommunications channel 10, it is arranged in step 1704 to read the price and data identification fields, and to call the verification sub routine of step 1502 of FIG. 5 in step 1706.

In executing the verification routine, the processor 100 generates the use request signal utilising the data identification and price fields, and in following the process of FIG. 2c, the billing device is arranged to utilise the price to generate the charging event (e.g. to store the price in a billing record).

After the billing event, and in the event that the user is authorised to download the data, in step 1708 the apparatus proceeds to permit the user to view or otherwise process the data. If not, the apparatus erases the downloaded data.

Sixth Embodiment

This embodiment operates in general according to the first, second, third or fourth embodiments, except that the program is embodied within the operating system of the apparatus 100 rather than within an applications program. Thus, a charge is made on every occasion when the apparatus 100 is used, according to the duration of use. In this way, the rental charge for computer equipment may be levied via the billing system of the telecommunications network, in dependence upon the actual level of use of the apparatus.

Seventh Embodiment

In this embodiment, (as depicted in FIG. 14) a plurality of apparatus 50, 60, 70 such as household appliances are charged on the basis of use, as in the above described sixth embodiment. For example, 50 may be a telephone set; 60 may be a video recorder; 70 may be a printer; and so on. All such devices are interconnected via a local area network 80 (which may be the electrical mains circuit if each of the devices 50–70 is equipped with a suitable modem). A head station 40 is connected to the LAN 80 and to the telecommunications channel 10. The head station 40 may comprise the local billing station 400 of the third or fourth embodiments, adapted to monitor multiple apparatus 50–70. Alternatively, it may merely interconnect the LAN 80 and PSTN 20.

Figure 3:
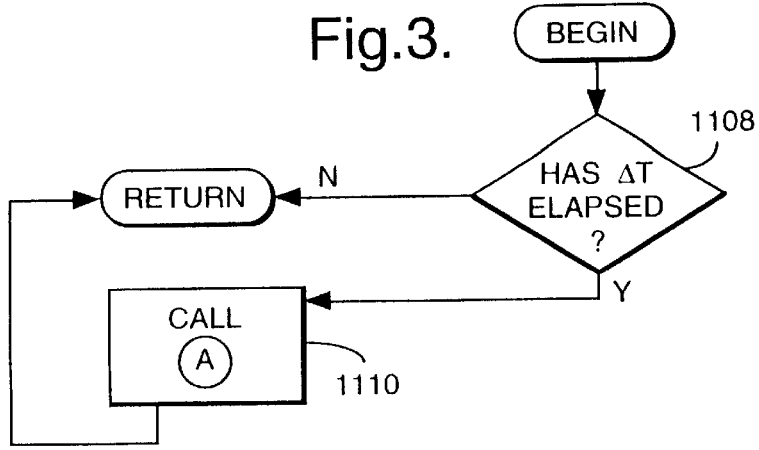
FIG. 3 is a flow diagram further showing the operation of the programmed apparatus in one example of an embodiment according to FIG. 1.

Each of the devices 50–70 comprises a microcontroller operating a stored program for executing the process of FIGS. 2b and 3, and/or 2b and 5. Thus, in this embodiment, multiple appliances may be charged according to the level of their use, or according to the use of special features thereof, via a communications channel, rather than being charged on a weekly or monthly basis.

Eighth Embodiment

In this embodiment, the invention is utilised to provide different charge rates for different services carried via a network such as the ISDN in which such different services are represented in a common data format.

In an integrated services digital network, multiple different communications services may be represented by the same physical data structures (e.g. asynchronous transfer mode (ATM) packets or "cells", or synchronous digital hierarchy (SDH) frames). Accordingly, it is generally assumed that charges for the use of such networks will be on a per cell, per frame or per bit basis.

Figure 15:
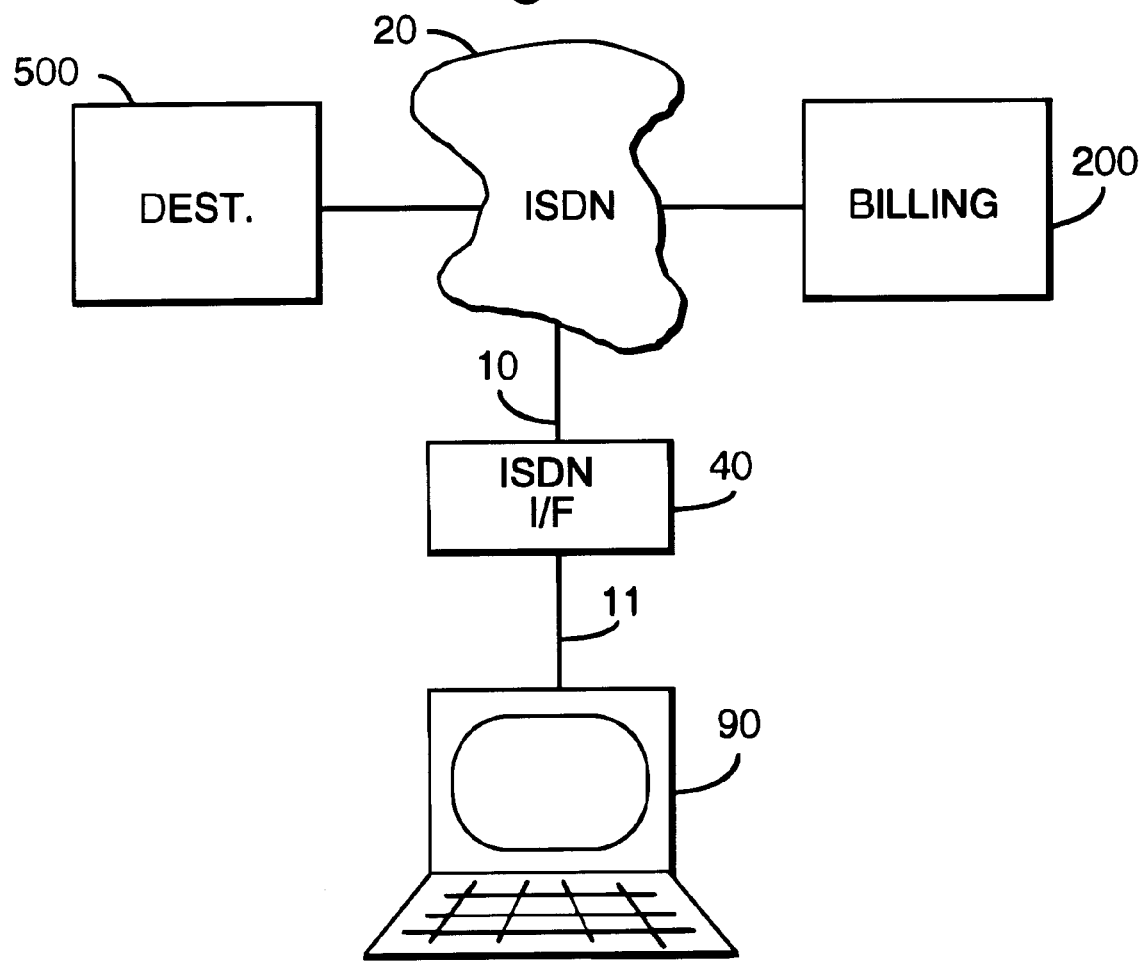
FIG. 15 is a block diagram showing the elements of a system for operating a communications terminal for value according to a seventh embodiment of the invention.

Referring to FIG. 15, according to the present embodiment, a communications terminal 90 (here a multi media personal computer) capable of communicating using one or more communications services (e.g. PCM audio, compressed audio, fax image, joint picture expert group (JPEG) image, moving picture expert group (MPEG) video, or ASCII file data) is connected via a connector 11 to an ISDN interface 40 connected in turn to an ISDN channel 10. The interface 40 comprises a protocol conversion device for receiving the communications service in its source format, as a digital bit stream via the link 11, from the communications terminal 90; and for converting the source format into a common network format (e.g. ATM cells or SDH frames).

The data in common network format is then transmitted, for example, on the "B" channels of the ISDN link to its destination 500 via the network 20. At the same time, charging initiating signals which indicate the format from which the data was converted by the interface 40 (and hence the communications service in use) are transmitted via the "D" channel to the billing centre 200.

Preferably, as in the above described embodiments, the interface 40 comprises a stored program for executing the process of FIGS. 2b and 3. Thus, the interface 40 will only permit use of the ISDN 20 when billing events for the corresponding service are being recorded in the billing centre 200. However, the concept of generating charging events for the use of a common format digital network by reference to the format of data prior to conversion to the common format is applicable independently of the features of the above described embodiments; if the physical security of the interface 40 and ISDN channel 10 is sufficiently good, it may be sufficient merely to transmit forward billing messages from the interface 40, without requiring return messages from the billing centre 200 to be received thereat.

As in the third or fourth embodiments, the interface 40 could also comprise the billing record store.

The interface 40 is preferably a separate unit, for increased security, but could be for example a card within a personal computer forming the communications terminal 90, or even a program executed by the processor of a personal computer forming the communications terminal 90. Naturally, other types of communications terminals (such as videophones) may be substituted for personal computers. Multiple such communications terminals may be connected to a single interface device 40.

It will be recognised that the above described embodiments are merely examples of the invention, and that the features of various embodiments may be used in different combinations than those described explicitly above. Moreover, the skilled reader will recognise many modifications and substitutions which may be made without departing from the present invention. Accordingly, any and all such modifications are substitutions are to be regarded as forming part of the invention. Protection is sought for any and all novel subject matter or combinations of subject matter which may be disclosed herein.

What is claimed is:

1. A method of operating a first apparatus for value, the apparatus being connected to a further apparatus, comprising a monitor device comprising a communications device and a programmable processor operating under the control of a stored program, arranged to control the use of the first apparatus, the first apparatus being connected to a telecommunications channel, the method comprising the steps of:

transmitting a forward message from the monitor device to a remote location via said telecommunications channel;

receiving a corresponding return message from said remote location via said telecommunications channel;

verifying said return message to determine whether it is authentic; and, if so;

permitting the operation of said first apparatus; and, if not;

inhibiting the operation of said first apparatus, the program being arranged to monitor the operation of the first apparatus and to perform the above steps periodically when the first apparatus is in use;

wherein, a predetermined progressive sequence of differing said forward messages is provided.

2. A method of operating a first apparatus for value, the apparatus being connected to a further apparatus, comprising a monitor device comprising a communications device and a programmable processor operating under the control of a stored program, arranged to control the use of the first apparatus, the first apparatus being connected to a telecommunications channel, the method comprising the steps of:

transmitting a forward message from the monitor device to a remote location via said telecommunications channel;

receiving a corresponding return message from said remote location via said telecommunications channel;

verifying said return message to determine whether it is authentic; and, if so;

permitting the operation of said first apparatus; and, if not;

inhibiting the operation of said first apparatus, the program being arranged to monitor the operation of the first apparatus and to perform the above steps periodically when the first apparatus is in use;

wherein, the forward messages are generated at predetermined time intervals while said first apparatus is in use.

3. A method of operating a computer apparatus for value, the computer apparatus being arranged to operate an application program using a programmable processor, the computer apparatus being further arranged to operate a second program using a programmable processor, the second program being arranged to control the use of the hardware of the computer apparatus used to run the application program, the computer apparatus being connected to a telecommunications channel, the method comprising the steps of:

transmitting a forward message via a communications device under the control of the second program, to a remote location via said telecommunications channel;

receiving a corresponding return message from said remote location via said telecommunications channel;

verifying said return message to determine whether it is authentic; and if so;

permitting the operation of said computer apparatus; and if not;

inhibiting the operation of said computer apparatus, the second program being arranged to monitor the operation of the computer apparatus and to perform the above steps periodically whenever the computer apparatus is in use;

wherein, a predetermined sequence of differing said forward messages is provided.

4. A method of operating a computer apparatus for value, the computer apparatus being arranged to operate an application program using a programmable processor, the computer apparatus being further arranged to operate a second program using a programmable processor, the second program being arranged to control the use of the hardware of the computer apparatus used to run the application program, the computer apparatus being connected to a telecommunications channel, the method comprising the steps of:

transmitting a forward message via a communications device under the control of the second program, to a remote location via said telecommunications channel;

receiving a corresponding return message from said remote location via said telecommunications channel;

verifying said return message to determine whether it is authentic; and if so;

permitting the operation of said computer apparatus; and if not;

inhibiting the operation of said computer apparatus, the second program being arranged to monitor the operation of the computer apparatus and to perform the above steps periodically whenever the computer apparatus is in use;

wherein, the forward messages are generated at predetermined time intervals while the computer apparatus is in use.

5. A method of charging for the operation of a first apparatus, the first apparatus being connected to a monitor device arranged to control the use of the first apparatus, the monitor device being connected to a telecommunications channel, the method comprising the steps of:

receiving a forward message from the monitor device;

verifying said forward message to determine whether it corresponds to a predetermined said first apparatus; and if so;

transmitting a return message to said monitor device; and generating a charging event associated with said operation of said first apparatus;

wherein, a predetermined progressive sequence of differing said forward messages is provided.

6. A method of charging for the operation of a first apparatus, the first apparatus being connected to a monitor device arranged to control the use of the first apparatus, the monitor device being connected to a telecommunications channel, the method comprising the steps of:

receiving a forward message from the monitor device;

verifying said forward message to determine whether it corresponds to a predetermined said first apparatus; and if so;

transmitting a return message to said monitor device; and generating a charging event associated with said operation of said first apparatus;

wherein, the forward messages are generated at predetermined time intervals while the apparatus is in use.

7. A method of charging for the operation of an apparatus, the apparatus comprising a computer, the computer being arranged to operate an application program using a first programmable processor, the computer being further arranged to operate a second program using the first or a second programmable processor, the second program being arranged to control the use of the hardware of the computer used to run the application program, the method comprising the steps of:

receiving a forward message from a monitor device associated with the apparatus, comprising a communications device and a programmable processor operating under the control of the second program, to a remote location via said telecommunications channel;

verifying said forward message to determine whether it corresponds to a predetermined said apparatus; and, if so;

transmitting a return message to said monitor device; and generating a charging event associated with said operation of said apparatus;

wherein, a predetermined progressive sequence of differing said forward messages is provided.

8. A method of charging for the operation of an apparatus, the apparatus comprising a computer, the computer being arranged to operate an application program using a first programmable processor, the computer being further arranged to operate a second program using the first or a second programmable processor, the second program being arranged to control the use of the hardware of the computer used to run the application program, the method comprising the steps of:

receiving a forward message from a monitor device associated with the apparatus, comprising a communications device and a programmable processor operating under the control of the second program, to a remote location via said telecommunications channel;

verifying said forward message to determine whether it corresponds to a predetermined said apparatus; and, if so;

transmitting a return message to said monitor device; and generating a charging event associated with said operation of said apparatus;

wherein, the forward messages are generated at predetermined time intervals while the apparatus is in use.

9. A method of charging for use of a digital network in which different services are carried in a common format, comprising the steps of:

generating charging signals at an originating terminal based on an original service format prior to conversion to said common format having a particular data structure, the charging signals representing charges payable by the user of the originating terminal;

transmitting a forward message to a remote location via a telecommunications channel;

receiving a corresponding return message from said remote location via said telecommunications channel;

verifying said return message to determine whether it is authentic; and, if so;

permitting operation of said terminal; and, if not;

inhibiting the operation of said terminal.

10. A method of charging for use of a digital network in which different services are carried in a common format, comprising the steps of:

generating charging signals at an originating terminal base on an original service format prior to conversion to said common format, the charging signals representing charges payable by the user of the originating terminal;

transmitting a forward message to a remote location via a telecommunications channel;

receiving a corresponding return message from said remote location via said telecommunications channel;

verifying said return message to determine whether it is authentic; and if so;

permitting the operation of said terminal; and, if not;

inhibiting the operation of said terminal;

wherein, a predetermined progressive sequence of differing said forward messages is provided.

11. A method according to claim 10 in which said forward message comprises an encoding of predetermined forward message data.

12. A method according to claim 10 in which said return message comprises an encoding of predetermined return message data.

13. A method according to claim 10 in which said predetermined data comprises said forward message data.

14. A method of charging for use of a digital network in which different services are carried in a common format, comprising the steps of:

generating charging signals at an originating terminal, connected to a telecommunications channel, based on an original service format prior to conversion to said common format having a particular data structure, the charging signals representing charges payable by the user of the originating terminal;

wherein the telecommunications channel is a digital channel capable of carrying multiple communications services in a common format, and further comprising an interface arranged to provide said communications service by converting data into said common format, in which the step of generating said charging signal is performed on converting said data.

15. A method according to claim 14 in which the communications terminal is arranged to provide a plurality of said services, and said forward message data indicates the identity of one of the services.

16. A method of charging for the operation of an apparatus, said apparatus having a processor operating under the control of a stored program which controls the use of said apparatus, said method comprising the steps of:

said apparatus transmitting a use request message to an authorization station via a communications channel;

verifying, at said authorization station, said use request message to determine whether said use request message was transmitted by said apparatus; and if so;

transmitting an authorization message from said authorization station to said apparatus via said communications channel;

generating a charging event associated with said authorization message;

verifying, at said apparatus, said authorization message to determine whether said authorization message is authentic; and, if so;

permitting the operation of said apparatus; and, if not;

inhibiting the operation of said apparatus, the stored program being arranged to monitor the operation of said apparatus and to perform the above steps periodically when said apparatus is in use.

17. A method according to claim 16, wherein said stored program contains a unique identifier code, said authorization code contains a unique identifier code, and said step of verifying said authorization message includes comparing the unique identifier code contained in the stored program with the unique identifier code contained in the authorization message.

18. A method according to claim 17, wherein a predetermined progressive sequence of differing said use request messages is provided.

19. A method according to claim 16, wherein said use request message comprises an encoding of predetermined forward message data.

20. A method according to claim 16, wherein said authorization message comprises an encoding of predetermined return message data.

21. A method according to claim 16, further comprising the step of recording said charging event in a stored record associated with said apparatus.

22. A method according to claim 18, wherein the use request messages are generated at predetermined time intervals while the apparatus is in use.

23. A method of charging for the operation of an apparatus, said apparatus having a processor operating under the control of a stored program which controls the use of said apparatus, said method comprising the steps of:

said apparatus transmitting a use request message to an authorization station via a communications channel;

verifying, at said authorization station, said use request message to determine whether said use request message was transmitted by said apparatus; and, if so;

transmitting an authorization message from said authorization station to said apparatus via said communications channel;

generating a charging event associated with said authorization message;

verifying, at said apparatus, said authorization message to determine whether said authorization message is authentic; and, if so;

permitting the operation of said apparatus; and, if not;

inhibiting the operation of said apparatus, the stored program being arranged to monitor the operation of said apparatus and to perform the above steps periodically when said apparatus is in use;

wherein a predetermined progressive sequence of differing said use request messages is provided.

24. A method of charging for the operation of an apparatus, said apparatus having a processor operating under the control of a stored program which controls the use of said apparatus, said method comprising the steps of:

said apparatus transmitting a use request message to an authorization station via a communications channel;

verifying, at said authorization station, said use request message to determine whether said use request message was transmitted by said apparatus; and, if so;

transmitting an authorization message from said authorization station to said apparatus via said communications channel;

generating a charging event associated with said authorization message;

verifying, at said apparatus, said authorization message to determine whether said authorization message is authentic; and, if so;

permitting the operation of said apparatus; and, if not;

inhibiting the operation of said apparatus, the stored program being arranged to monitor the operation of said apparatus and to perform the above steps periodically when said apparatus is in use;

wherein, the use request messages are generated at predetermined time intervals while the apparatus is in use.

* * * * *